2,895,871
POLYCHLOROBENZHYDROLS

Charles E. Entemann, Painesville, Ohio, assignor to Diamond Alkali Company, Cleveland, Ohio, a corporation of Delaware No Drawing. Application January 9, 1957
Serial No. 633,192

6 Claims. (Cl. 167—30)

This invention relates to novel polyhalobenzhydrols and more particularly relates to novel hexahalobenzhydrols having the following structure:

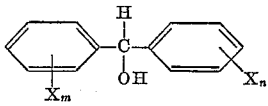

wherein X is halogen, preferably chlorine, m is a number from 1 to 5, inclusive, preferably 3, and n is a number from 1 to 5, inclusive, preferably 3. Especially preferred compounds of this invention are those wherein m=n=3, i.e., the hexahalobenzhydrols, notably hexachlorobenzhydrols.

Specific illustrative compounds of this invention are 2,4,5,2′,4′,5′-hexachlorobenzhydrol having the structure

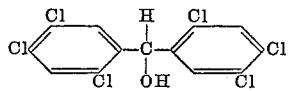

and hexachlorobenzhydrol having the structure

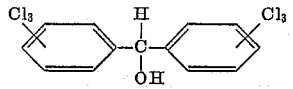

Compounds of this invention are useful as biologically active materials, for example, as fungicides, i.e., as the active ingredient in fungicidal compositions.

Compounds of this invention generally can be prepared by chemically combining one or a mixture of halobenzophenones with a suitable reducing agent, such as lithium aluminum hydride, preferably in the presence of an organic solvent.

In order that those skilled in the art may more completely understand the present invention and the preferred methods by which the same may be carried into effect, the following specific examples are offered:

EXAMPLE I

(Part A)

*Preparation of hexachlorobenzhydrol.*—Into a 1-liter, 3-necked, round-bottomed flask equipped with a dropping funnel, thermometer and reflux condenser is introduced 4.5 gms. (0.12 mol) of lithium aluminum hydride suspended in 100 ml. of dry ether and over a period of 45 minutes with continuous agitation is added 61 gms. (0.16 mol) of hexachlorobenzophenone dissolved in 150 ml. of dry ether. After addition is complete, refluxing is continued for about 2½ hours. There is then added to the reaction mixture 10 ml. of water to decompose any unreacted hydride and subsequently 200 ml. of 10% sulfuric acid to dissolve precipitated alumina.

The ether solution is then separated, washed with 10% sodium carbonate and dried with anhydrous magnesium sulfate and finally evaporated. The water white syrupy residue is dried at 90°–100° C. to a constant weight and steam distilled to remove residual steam volatile material. The hydrol then is allowed to solidify. This product is dissolved in 150 ml. of methanol and filtered into 2 liters of water containing ice and about 50 ml. dilute hydrochloric acid. The resultant white precipitate is separated, washed with water, reslurried in water, filtered again and air dried to a white product melting at 55°–60° C. to a thick viscous liquid. Chemical analysis of this product, obtained in 96.5% yield, indicates preparation of the desired $C_{13}H_6Cl_6O$ and is as follows:

| Element | Percent Actual | Percent Calculated |
|---|---|---|
| C | 40.1 | 39.9 |
| H | 1.66 | 1.54 |

(Part B)

The product of Part A is employed in a test as a tomato foliage treatment against infection by the early blight fungus *Alternaria solani*, employing tomato plants 5 to 7 inches high of the variety Bonny Best. Duplicate plants are sprayed with 100 ml. of the test formulation (2000 p.p.m. test chemical—5% acetone—0.01% Triton X–155—balance water) at 40 lbs. air pressure, while being rotated on a turntable in a spray chamber. After the spray deposit is dry, the treated plants and comparable untreated controls (sprayed with formulation less toxicant) are sprayed with a spore suspension containing approximately 20,000 conidia of *Alternaria solani* per ml.

The thus-treated plants are held in a water-saturated atmosphere for 24 hours at 70° F. to permit spore germination and infection before removal to the greenhouse. After 2 to 4 days, lesion counts are made on the three uppermost fully expanded leaves. The data are converted to percentage disease control based on the number of lesions obtained on the control plants.

Using the above procedure, at a concentration of 2000 p.p.m., an 84% disease control is obtained. At a lower concentration of 400 p.p.m., a 78% disease control is obtained, thus indicating a high degree of fungicidal activity at both concentrations.

(Part C)

Spore germination tests on glass slides using the product of Part A are conducted via the test tube dilution method adopted from the procedure recommended by the American Phytopathological Society's committee on standardization of fungicidal tests. In this procedure the test chemical, in aqueous formulations at concentrations of 1000, 100, 10 and 1.0 p.p.m., is tested for its ability to inhibit germination of spores from 7 to 10-day-old cultures of *Alternaria oleracea*. These concentrations refer to initial concentrations before diluting four volumes with one volume of spore stimulant and spore suspension. Germination records are taken after 20 hours of incubation at 22° C. by counting 100 spores. The test compound is rated as to the concentration that inhibits germination of half of the spores, i.e., the so-called ED–50 value, in the test drops. Using the above procedure, a rating of 10 to 100 p.p.m. is obtained, thus indicating a high degree of fungicidal activity.

EXAMPLE II

(Part A)

*Preparation of 2, 4, 5, 2′, 4′, 5′-hexachlorobenzhydrol.*—Into a 1-liter, 3-necked, round-bottomed flask equipped with a stirrer, dropping funnel and reflux condenser containing 3.4 gms. (0.09 mol) of lithium aluminum hydride suspended in 150 ml. of dry ether are added 47 gms. (0.12 mol) of 2,4,5,2′,4′,5′-hexachlorobenzophenone dissolved in 200 ml. dry dioxane over a period of 45 minutes during which time the temperature rises to 41° C. Refluxing is continued with agitation for about 3 hours at which time the stirred mixture is cooled in an ice bath and 10 ml. of water added dropwise at 12°–16° C.

The reaction mixture is then stirred into a mixture of ice and 125 ml. 1:1 HCl. The resulting 2-liquid layer system is then diluted to about 2 liters with water. As the mixture is stirred, a syrupy organic mass gradually separates into a white crystalline solid which is filtered off. This crude white product, obtained in a quantitative yield, is dissolved in 300 ml. of isopropanol, filtered to remove turbidity and the filtrate concentrated to about 200 ml. After cooling, a white precipitate melting at 179.5–180.5° C. is obtained.

Chemical analysis of this product indicates preparation of the desired $C_{13}H_6Cl_6O$ and is as follows:

| Element | Percent Actual | Percent Calculated |
|---|---|---|
| C | 40.4 | 39.9 |
| H | 1.76 | 1.54 |

(Part B)

The procedure of Example I, Part C, is repeated using as the test chemical the 2,4,5,2′,4′,5′-hexachlorobenzhydrol of Example II, Part A and an ED-50 value of 10–100 p.p.m. is obtained.

While the compounds of this invention exhibit biological activity, the present invention does not necessarily contemplate that their use will be restricted to such applications, but that they will be useful in a variety of applications. In this connection, it will be appreciated that when employed in biological applications, as well as other possible uses, they may well be employed as formulations wherein they constitute but a minor amount of the total compositions. For example, they may be employed as essential ingredients in various compositions including a major proportion of one or more diluents, extenders, fillers, conditioners, solvents and the like, such as various clays, diatomaceous earth, talc, spent catalyst, alumina silica materials, and such liquids as water and various organic liquids such as acetone, kerosene, benzene, toluent, xylene and other petroleum distillate fractions or mixtures thereof. When liquid formulations are employed, or dry materials prepared, which are to be used in liquid form, it is desirable in certain instances additionally to employ a wetting, dispersing or other surface-active agent to facilitate use of the formulation, e.g., Triton X-155 (alkyl aryl polyether alcohol).

The term "carrier" as employed throughout the specification and claims is intended to refer broadly to the materials constituting a major proportion of a biologically active or other formulation and hence includes finely-divided materials, both liquids and solids, as aforementioned, conventionally used in such an application.

It is to be understood that although the invention has been described with specific reference to particular embodiments thereof, it is not to be so limited, since changes and alterations therein may be made which are within the full intended scope of this invention as defined by the appended claims.

What is claimed is:
1. The compound

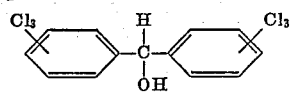

2. The compound

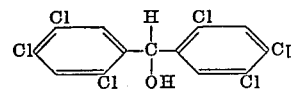

3. A biologically active composition of matter which comprises a carrier and a polychlorobenzhydrol.
4. A fungicidal composition which comprises a major proportion of a carrier and a minor proportion of a hexachlorobenzhydrol.
5. The method of controlling fungus growth which comprises employing as a fungicidal composition a polychlorobenzhydrol as an essential active fungicidal ingredient.
6. The method of controlling fungus growth which comprises employing as a fungicidal composition a hexachlorobenzhydrol as an essential active fungicidal ingredient.

References Cited in the file of this patent

Newman et al., Jour. Amer. Chem. Soc., vol. 73 (1951), pp. 3644–50.

March et al.: Jour. Econ. Entomol., vol. 45 (1952), pp. 851–853.